(12) United States Patent
Xiong et al.

(10) Patent No.: US 11,952,536 B2
(45) Date of Patent: Apr. 9, 2024

(54) CARBON-DIOXIDE-RESPONSIVE SELF-THICKENING INTELLIGENT FLUID BASED ON SUPRAMOLECULAR SELF-ASSEMBLY

(71) Applicant: PetroChina Company Limited, Beijing (CN)

(72) Inventors: Chunming Xiong, Beijing (CN); Falin Wei, Beijing (CN); Haiyang Yang, Beijing (CN); Yongjun Xie, Beijing (CN); Liming Shao, Beijing (CN); Kang Peng, Beijing (CN); Zhihui Zeng, Beijing (CN)

(73) Assignee: PetroChina Company Limited, Beijing (CN)

( * ) Notice: Subject to any disclaimer, the term of this patent is extended or adjusted under 35 U.S.C. 154(b) by 158 days.

(21) Appl. No.: 17/739,378

(22) Filed: May 9, 2022

(65) Prior Publication Data
US 2022/0259485 A1   Aug. 18, 2022

Related U.S. Application Data

(63) Continuation of application No. PCT/CN2021/089563, filed on Apr. 25, 2021.

(30) Foreign Application Priority Data

May 8, 2020  (CN) .......................... 202010381489.7

(51) Int. Cl.
   *C09K 8/584*   (2006.01)
   *C09K 8/594*   (2006.01)
   *E21B 43/16*   (2006.01)

(52) U.S. Cl.
   CPC .............. *C09K 8/584* (2013.01); *C09K 8/594* (2013.01); *E21B 43/164* (2013.01)

(58) Field of Classification Search
   None
   See application file for complete search history.

(56) References Cited

U.S. PATENT DOCUMENTS

| 11,525,081 B2 * | 12/2022 | Obot ........................ C09K 8/54 |
| 11,879,093 B2 * | 1/2024  | Feche ....................... C09K 8/54 |

(Continued)

FOREIGN PATENT DOCUMENTS

| CN | 105536638 A | 5/2016 |
| CN | 106986775 A | 7/2017 |

(Continued)

OTHER PUBLICATIONS

Xiong, Chunming et al. "A CO2-responsive Smart Fluid Based on Supramolecular Assembly Structures Varying Reversibly from Vesicles to Wormlike Micelles" The Royal Society of Chemistry, vol. 10, No. 42, Jul. 3, 2020.

(Continued)

*Primary Examiner* — John J Figueroa
(74) *Attorney, Agent, or Firm* — Hamilton, Brook, Smith & Reynolds, P.C.

(57) ABSTRACT

Disclosed is a carbon-dioxide-responsive self-thickening intelligent fluid based on supramolecular self-assembly, which comprises a Gemini surfactant, a single-chain amide molecule having a tertiary amine head group and water, wherein the Gemini surfactant and the single-chain amide molecule are self-assembled to form a vesicle structure dispersed in water, with a hydrophilic head group being located outside and a hydrophobic tail group located inside. The method for preparing the carbon-dioxide-responsive self-thickening intelligent fluid of the present invention is simple, the injection viscosity is low, and the fluid is converted into a gel when encountering carbon dioxide, so that the viscosity is greatly increased.

16 Claims, 6 Drawing Sheets

(56) References Cited

U.S. PATENT DOCUMENTS

| | | | | |
|---|---|---|---|---|
| 2008/0248977 | A1* | 10/2008 | Knox | C09K 8/68 |
| | | | | 507/240 |
| 2011/0071056 | A1* | 3/2011 | Saini | C09K 8/035 |
| | | | | 507/131 |
| 2013/0161014 | A1 | 6/2013 | Pakenham et al. | |
| 2014/0284057 | A1* | 9/2014 | Champagne | C09K 8/602 |
| | | | | 166/305.1 |
| 2016/0272875 | A1 | 9/2016 | Ghumare et al. | |
| 2018/0119003 | A1 | 5/2018 | Eluru et al. | |
| 2018/0334611 | A1 | 11/2018 | Dai et al. | |
| 2019/0256458 | A1 | 8/2019 | Hussain et al. | |

FOREIGN PATENT DOCUMENTS

| | | |
|---|---|---|
| CN | 107011884 A | 8/2017 |
| CN | 107435532 A | 12/2017 |
| CN | 107445857 A | 12/2017 |
| RU | 2690173 C2 | 2/2016 |
| WO | 2016182542 A1 | 11/2016 |
| WO | 2021223609 A1 | 11/2021 |

OTHER PUBLICATIONS

Zhang, Yongmin et al. "Smart Wormlike Micelles Switched by CO2 and Air" Soft Matter, vol. 9, No. 27, May 20, 2013.

Wu, Xuepeng et al. "CO2-responsive Smart Wormlike Micelles Based on Monomer and "Pseudo" Gemini Surfactant" Journal of Industrial and Engineering Chemistry, vol. 60, Nov. 26, 2017.

Fan, Ya-Xun et al., Effects of Molecular Structures on Aggregation Behavior of Gemini Surfactants in Aqueous Solutions, vol. 32 No.1, Jan. 31, 2016 (Nov. 2, 2015).

Wu Wen et al., Synthesis and performance of tertiary amine-based CO2 switchable surfactants, China Surfactant Detergent & Cosmetics, vol. 46 No.5 (May 2016).

Liu Hai-yan et al., Research on synthesis and surface properties of Gemini CO2/N2 switchable surfactants, Journal of Molecular Science, vol. 34 No.4 (Aug. 2018).

International Search Report with English Translation for International Application No. PCT/CN2021/089563, "Carbon-Dioxide-Responsive Self-Thickening Intelligent Fluid Based on Supramolecular Self-Assembly", dated Jul. 12, 2021.

Supplementary Chinese Search Report for CN Application No. 202010381489.7, "Carbon-Dioxide-Responsive Self-Thickening Intelligent Fluid Based on Supramolecular Self-Assembly", dated Apr. 8, 2022.

Chinese Search Report for CN Application No. 202010381489.7, "Carbon-Dioxide-Responsive Self-Thickening Intelligent Fluid Based on Supramolecular Self-Assembly", dated Mar. 21, 2022.

Supplementary European Search Report for EP Application No. EP 21800686, "Carbon-Dioxide-Responsive Self-Thickening Intelligent Fluid Based on Supramolecular Self-Assembly", dated Oct. 17, 2022.

* cited by examiner

CARBON-DIOXIDE-RESPONSIVE SELF-THICKENING INTELLIGENT FLUID BASED ON SUPRAMOLECULAR SELF-ASSEMBLY

CROSS-REFERENCE TO RELATED APPLICATIONS

This application is a continuation of International Application No. PCT/CN2021/089563, which designated the United States and was filed on Apr. 25, 2021, published in Chinese, which claims priority under 35 U.S.C. § 119 or 365 to Chinese Patent Application No. 202010381489.7, filed on May 8, 2020, both of which are hereby incorporated by reference in their entireties.

TECHNICAL FIELD

The present invention relates to the technical field of oil and gas field development, and specifically to a carbon dioxide responsive self-thickening smart fluid based on supramolecular self-assembly, and preparation and use thereof.

BACKGROUND

As a worldwide second-place technology for improving recovery and one of the main methods to improve the recovery in low-permeability reservoirs, carbon dioxide flooding technology for improving recovery is widely valued by countries around the world for its large applicable range, high flooding efficiency and low cost.

However, in field applications, gas channeling caused by various factors such as reservoir non-homogeneity severely restricts the gas swept volume, making it difficult for carbon dioxide flooding to achieve the test results of indoor oil flooding test.

Currently, there are a series of solutions such as water-alternating-gas (WAG) injection, gel sealing, chemical precipitation, carbon dioxide foam and carbon dioxide thickening for the problem of gas channeling.

However, there are following problems in the current technologies. The WAG injection is a process including a combination of two traditional processes, water-flooding and gas-flooding, to improve recovery, which has high completion costs, a complex process, and inability to adapt to strongly non-homogeneous conditions. The gel sealing is a process in which a polymer is cross-linked into a gel to plug the localized high permeable zone, which involves polymers having large molecular weight (10-15 million), poor injection ability under low permeability reservoir conditions, and permanent damage to the reservoir by the resulting cross-linked gel. The chemical precipitation is a process in which chemical reagents are used to react with carbonates to generate precipitate to plug carbon dioxide gas escaping channels, but the chemical precipitation reaction is weakly controllable. The carbon dioxide foam sealing faces challenges of low strength of the generated foam and difficulties for controlling foaming under reservoir conditions. The carbon dioxide thickening is a process to directly thicken the carbon dioxide gas, which has not been studied thoroughly enough, and has problems such as high configuration cost and difficult configuration process.

Smart responsive materials are a new class of materials that are changed in some physical structures or chemical properties in response to external environmental stimuli. These external stimuli include physical stimuli such as heat, light, electric and magnetic fields, as well as chemical stimuli such as glucose, pH and ionic strength. A carbon dioxide responsive system means that the system will show some special physical and chemical properties when an external $CO_2$ gas stimulus is applied to the system, and return to its initial state when this stimulus is removed. Jessop et al. first reported a new solvent with switchable polarity based on amidinium groups, which undergoes significant changes in polarity and viscosity upon the introduction of carbon dioxide gas. Feng et al. first reported a carbon dioxide responsive worm-like smart microgel, in which alkyl tertiary amine based materials are synthesized by aliphatic alcohol method, Leuckart method, chlorinated alkyl amination method, sodium lauryl sulfate method, α-olefin bromination method and the like. The material is hydrophobic in its initial state and behaves as a low-viscosity, white, milky solution in an aqueous solution. When a carbon dioxide gas is introduced into the system, the system gradually changes from a solution to an elastic and transparent gel. However, the synthesis process of the two responsive materials mentioned by Jessop, Feng etc. is complicated and costly, making it difficult to be scaled to industrial-scale applications.

Therefore, it is of great importance to develop a carbon dioxide responsive self-thickening system for gas channeling, which is simple in the synthesis process and low in cost, to efficiently expand the application of technologies involving carbon dioxide flooding swept volume.

SUMMARY

In view of above, the present invention provides a carbon dioxide responsive self-thickening smart fluid based on supramolecular self-assembly and preparation and use thereof. The carbon dioxide responsive self-thickening smart fluid is simple to prepare, has low injection viscosity, transforms into a gel with significantly increased viscosity upon exposure to $CO_2$, and thus effectively solves the problems of gas channeling along localized high permeability channels and the resulting significant reduction in swept volume during the carbon dioxide gas flooding for improving recovery in low permeability reservoirs.

In order to achieve the above objects, the following technical solutions are proposed in the present invention.

A first aspect of the present invention provides a carbon dioxide responsive self-thickening smart fluid based on supramolecular self-assembly, comprising a Gemini surfactant, a single-chain amide molecule with a tertiary amine head group, and water.

The Gemini surfactant has a structure as follows:

The single-chain amide molecule with a tertiary amine head group has a structure as follows:

wherein R is an alkyl chain of C11-21, preferably C12-17; n is 1 to 3; p is 1 to 6; and Y is Cl or Br.

The Gemini surfactant and the single-chain amide molecule with a tertiary amine head group may self-assemble to form a vesicle structure dispersed in water, wherein the hydrophilic head group is exposed outside and the hydrophobic tail is hided inside; the hydrophilic head group is the tertiary amine head group in the single-chain amide molecule and the quaternary ammonium head group in the Gemini surfactant, while the hydrophobic tail is the alkyl chain R.

Figure 7:
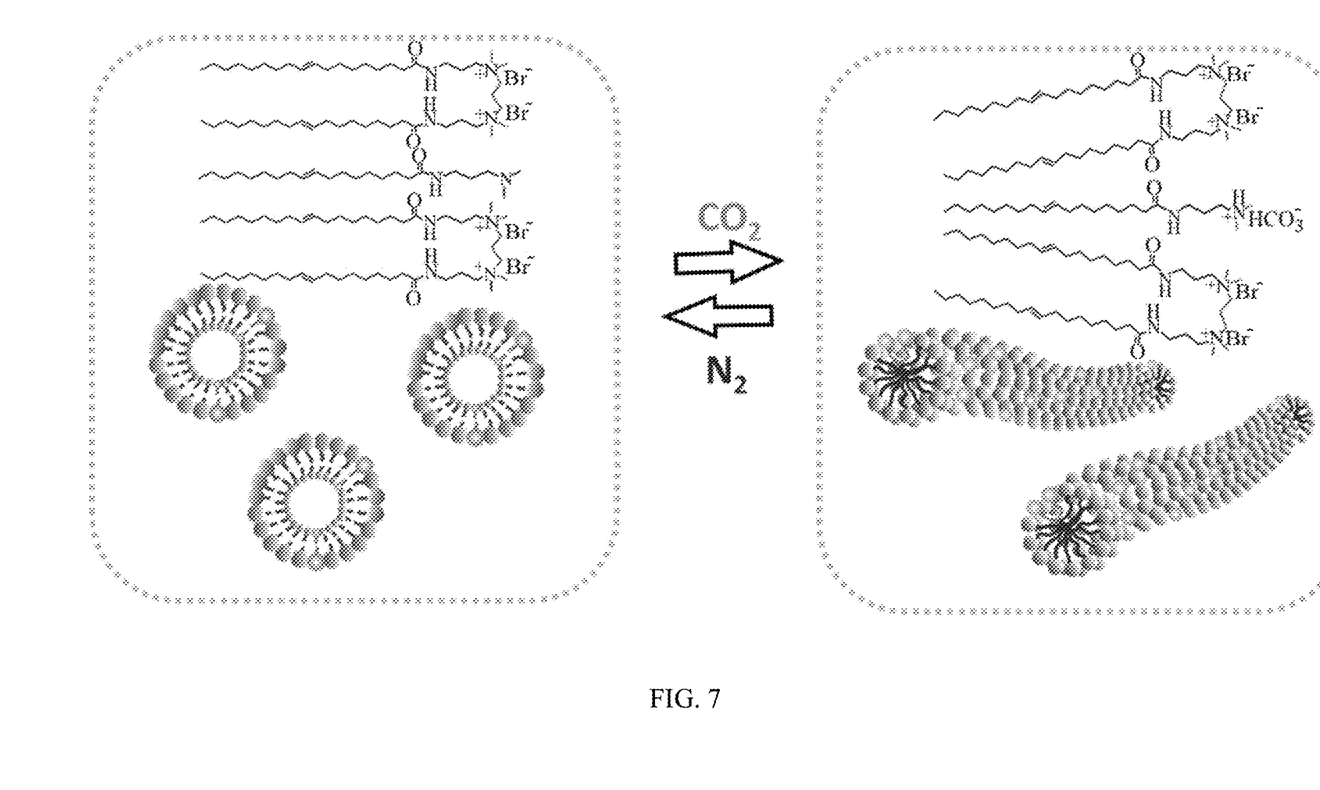
FIG. 7 is a schematic diagram showing the mechanism of the carbon dioxide responsive self-thickening smart fluid of the present invention in response to $CO_2$.

The system has an initial viscosity as low as only a few mPa·s, which makes it easy to inject. Upon exposure to $CO_2$, the single-chain amide molecule with a tertiary amine head group is protonated to become a surfactant, at which time the aggregation morphology of two surfactant molecules changes (as shown in FIG. 7), from vesicles to worm-like micelles, causing the viscosity of the system increased by an order of magnitude, which could achieve effective blockage of $CO_2$.

Preferably, p is 3.
Preferably, Y is Br.
Preferably, R is $CH_3(CH_2)_7CH=CH(CH_2)_7—$.
Preferably, R is $CH_3(CH_2)_7CH=CH(CH_2)_7—$, n is 2, p is 3, and Y is Br.

Preferably, the Gemini surfactant is included in an amount of 1% to 4%, and the single-chain amide molecule with a tertiary amine head group is included in an amount of 0.5% to 1.2%, and the balance is water, based on the total mass of the carbon dioxide responsive self-thickening smart fluid being 100%.

A second aspect of the present invention provides a method for preparing the above-mentioned carbon dioxide responsive self-thickening smart fluid, produced by a process I or II as follows.

Process I: dissolving the Gemini surfactant and the single-chain amide molecule with a tertiary amine head group in a ratio in water, to obtain the carbon dioxide responsive self-thickening smart fluid.

Process II: reacting the single-chain amide molecule with a tertiary amine head group with a linking molecule of $Y—(CH_2)_p—Y$ to give a mixture of the Gemini surfactant and the unreacted single-chain amide molecule with a tertiary amine head group; controlling the molar ratio of the single-chain amide molecule with a tertiary amine head group to the linking molecule of $Y—(CH_2)_p—Y$ during the reaction, so that the ratio of the Gemini surfactant as produced by the reaction to the unreacted single-chain amide molecule with a tertiary amine head group satisfies the requirement for the ratio of them in the carbon dioxide responsive self-thickening smart fluid; and dissolving the mixture produced by the reaction in water to obtain the carbon dioxide responsive self-thickening smart fluid.

Preferably, in method II, the molar ratio of the single-chain amide molecule with a tertiary amine head group to the linking molecule of $Y—(CH_2)_p—Y$ is 2.0: (0.1 to 1.0).

Preferably, the Gemini surfactant is prepared by the following step:
reacting the single-chain amide molecule with a tertiary amine head group with the linking molecule of $Y—(CH_2)_p—Y$ to obtain the Gemini surfactant.

Preferably, the single-chain surfactant is prepared by the following step:
subjecting a carboxylic acid of R—COOH, where R is defined above, and a diamine of $NH_2CH_2(CH_2)_nN(CH_3)_2$ to an amidation reaction to obtain the single-chain amide molecule with a tertiary amine head group.

The whole reaction process for Gemini surfactant is shown in the following equation.

wherein R is an alkyl chain of C11-21; n is 1 to 3; p is 1 to 6; and Y is Cl or Br.

Preferably, the amidation reaction comprises the following step:
dissolving the carboxylic acid of R—COOH in organic solvent, then heating it to a temperature of 160 to 180° C.; adding a diamine of $NH_2CH_2(CH_2)_nN(CH_3)_2$ dropwise, and holding and reacting it for 6 hours to 8 hours upon the completion of addition; and cooling and removing the solvent by rotary vacuum evaporation to obtain the single-chain amide molecule with a tertiary amine head group.

Preferably, the molar ratio of the carboxylic acid of R—COOH to the diamine of $NH_2CH_2(CH_2)_nN(CH_3)_2$ is 1: (1.2 to 1.8).

Preferably, the process of reacting the single-chain amide molecule with a tertiary amine head group with the linking molecule of $Y—(CH_2)_p—Y$ comprises:
dissolving the single-chain amide molecule with a tertiary amine head group in an organic solvent, adding the linking molecule of $Y—(CH_2)_p—Y$ dropwise, and heating the resultant upon the completion of addition to carry out the reaction, to obtain the Gemini surfactant.

Preferably, the organic solvent is ethanol, the resultant is heated to a reflux temperature of ethanol, and the reaction is carried out for 6 to 16 hours.

A third aspect of the present invention provides use of the carbon dioxide responsive self-thickening smart fluid described above in a carbon dioxide gas flooding.

In the carbon dioxide responsive self-thickening smart fluid of the present invention, the single-chain amide molecules with tertiary amine head groups and Gemini surfactants with quaternary ammonium head groups form a vesicle structure through self-assembly. When injected into the formation and exposed to $CO_2$ gas, the single-chain amide molecules with tertiary amine head groups are protonated to transform the surfactant structure from a vesicle to a worm-like micelle, thereby realizing a significant increase in system viscosity. The increased system viscosity increases the resistance for gas channeling along the local high permeability channel, and directs the gas to the low-permeability area, which can significantly expand the swept volume of carbon dioxide gas flooding, and thus effectively solve the gas channeling problem in carbon dioxide gas flooding and replacement for low permeability reservoirs.

DETAILED DESCRIPTION

For a more clear interpretation, the present invention is further described below in conjunction with preferred examples. It should be understood by those skilled in the art that the detailed description below is illustrative rather than limiting, and should not be used to limit the protection scope of the present invention.

In the Examples of the present invention, the raw materials as used, such as oleic acid, N,N-dimethylpropanediamine, 1,3-dibromopropane, ethanol and potassium carbonate, were provided by Sinopharm Chemical Reagent Co., Ltd.

The following devices/equipments were used:
the four-necked flask, single-necked flask and constant-pressure dropping funnel, as produced by Beijing Xinweier Glass Instrument Co., Ltd., used for performing reaction and reagent addition;
the magnetic heating stirrer model EUROSTAR, as produced by IKA, Germany, used for heating and stirring; and
the multifunctional rheometer model TAAR-G2, as made in the United States, and the Broofield viscometer model DV-III, as made in the United States, used for the analysis of the viscosity of the carbon dioxide self-thickening smart fluid.

Example 1

Synthesis of the Single-Chain Amide Molecule With a Tertiary Amine Head Group and Gemini Surfactant The synthetic route in the example is shown below:

1 mol of oleic acid was added to a four-necked flask and heated to 170° C.; 1.5 mol of N,N-dimethylmalondiamine was added dropwise to the oleic acid through a dropping funnel, over an addition time controlled to be about 4 hours. After addition, the system was kept warm under stirring for 6 hours, and the water generated by the reaction was distilled and discharged during the reaction. The acid value of the system was measured by titration with a formulated standard potassium carbonate solution. The reaction was stopped when the acid value of the system was lower than 5 mg/g KOH. Then the excess N,N-dimethylpropylenediamine was removed by distillation under reduced pressure to obtain an intermediate comprising tertiary amine (i.e. the single-chain amide molecule with a tertiary amine head group).

Figure 1:
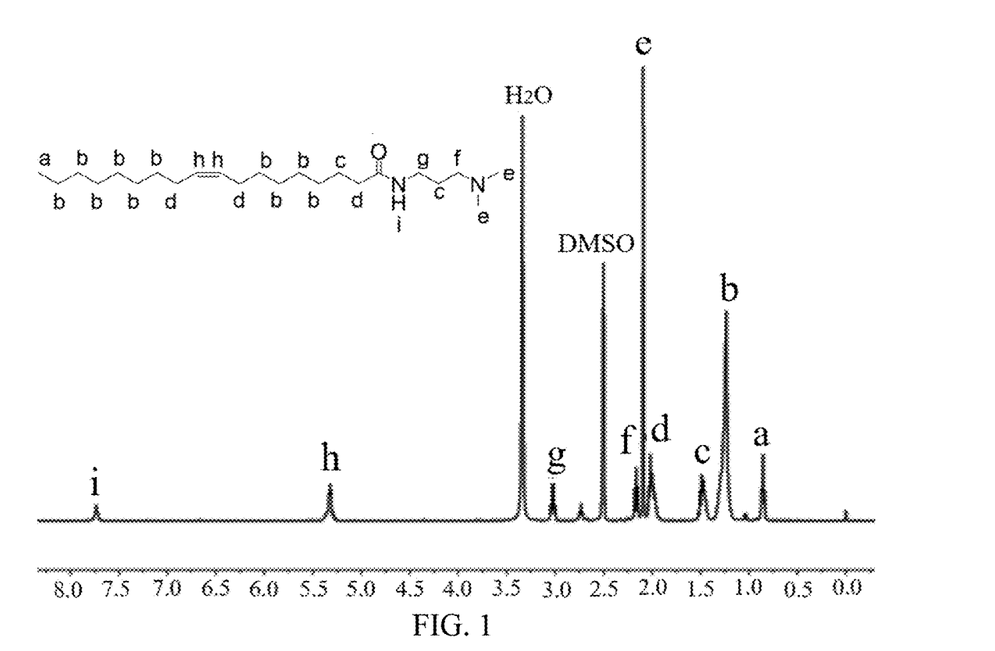
FIG. 1 is the NMR spectrum of the single-chain amide molecule with a tertiary amine head group as prepared in Example 1.

The NMR spectrum of the single-chain amide molecule with a tertiary amine head group is shown in FIG. 1.

1 mol of the intermediate comprising tertiary amine was dissolved in ethanol, and transferred to a single-neck flask; 0.5 mol of 1,3-dibromopropane was added dropwise and then stirred well. Next, the system was heated to the reflux temperature of ethanol for reaction over 12 hours. Then the reaction was stopped to obtain the Gemini surfactant with a quaternary ammonium head group.

By controlling the amount of 1,3-dibromopropane used, the ratio of the single-chain amide molecule with a tertiary amine head group to Gemini surfactant with a quaternary ammonium head group in the final product can be controlled. In this example, 1,3-dibromopropane was added in equal equivalents, which theoretically gives 0.5 mol Gemini surfactant.

After the reaction is over, the system was spin-evaporated directly and placed in a vacuum oven at a room temperature for 24 hours to obtain a waxy product, which was the Gemini surfactant.

Figure 2:
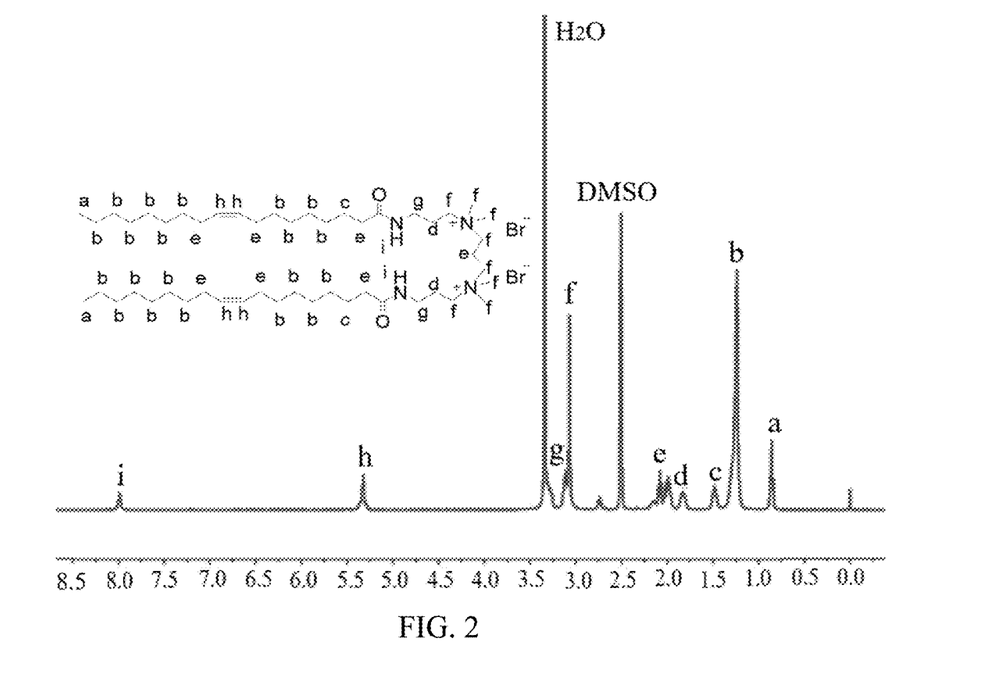
FIG. 2 is the NMR spectrum of the Gemini surfactant as prepared in Example 1.

The NMR spectrum of the Gemini surfactant is shown in FIG. 2.

Example 2

Preparation and Characterization of the Carbon Dioxide Responsive Self-Thickening Smart Fluid The single-chain amide molecule with a tertiary amine head group as produced in Example 1 and the Gemini surfactant with a quaternary ammonium head group obtained therefrom were dissolved directly in water at a certain concentration and ratio to produce the corresponding carbon dioxide responsive self-thickening smart fluid.

Figure 3:
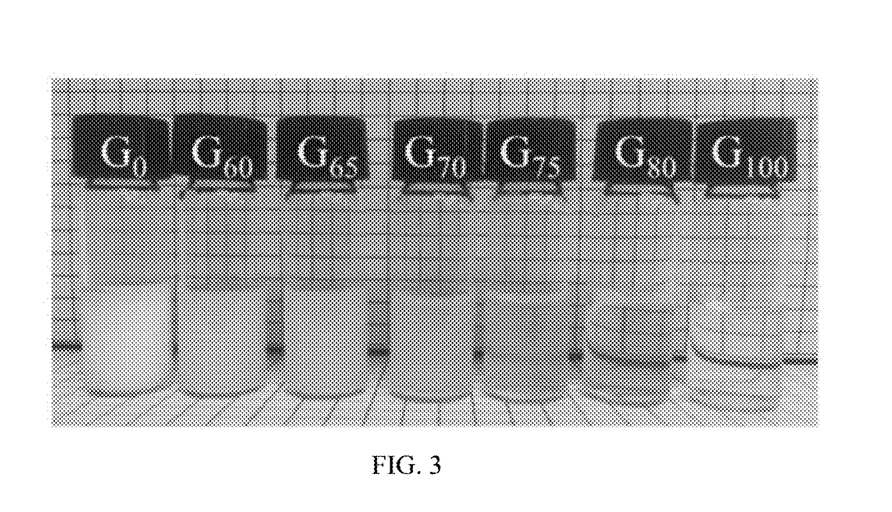
FIG. 3 is a picture of the appearance of the carbon dioxide responsive self-thickening smart fluids as obtained in Example 2.
Figure 4A:
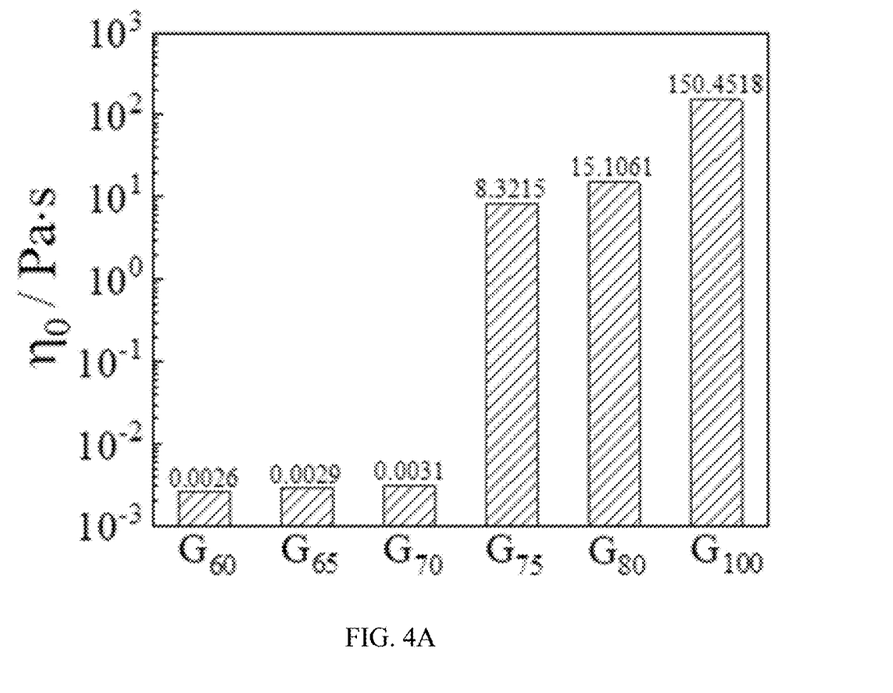
FIG. 4A is a graph showing the zero shear viscosities as a function of quaternization reaction conversions (different Gemini surfactant contents) for the carbon dioxide responsive self-thickening smart fluid as prepared in Example 2.
Figure 4B:
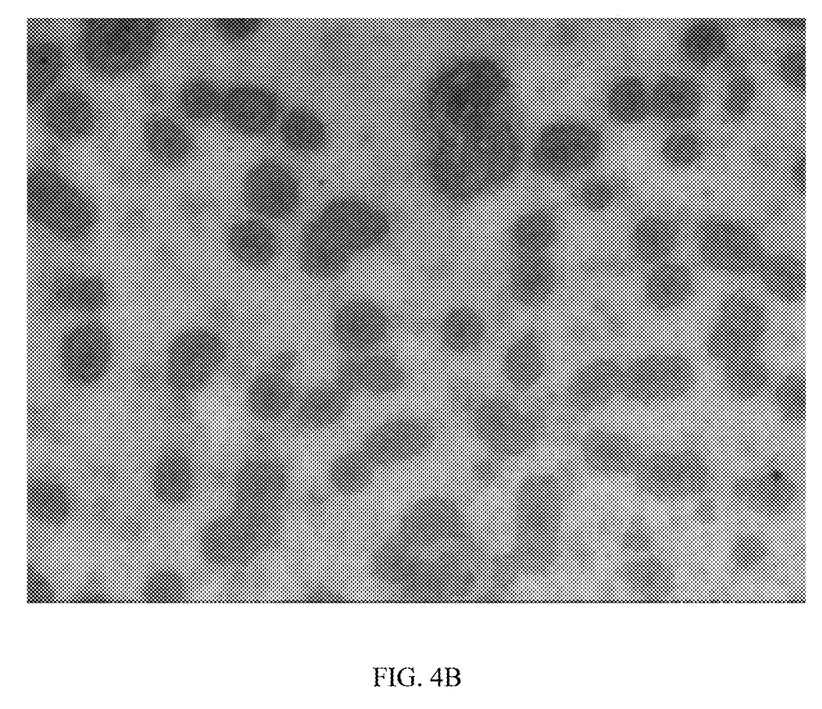
FIG. 4B is a cryo-SEM graph of the $G_{70}$ sample (containing 70% of Gemini surfactant).

The total mass concentration in this example was controlled at 2%. The influences of the ratio of Gemini surfactant to single-chain amide molecule in the final product on the appearance, zero shear viscosity and structure of the resulting carbon dioxide responsive self-thickening smart fluid are shown in FIGS. 3, 4A and 4B. The X in $G_x$ in the Figures indicates the mass percentage of Gemini surfactant based on the sum of Gemini surfactant and single-chain amide molecules in the system. Seven samples labeled as $G_0$, $G_{60}$, $G_{65}$, $G_{70}$, $G_{75}$, $G_{80}$ and $G_{100}$ were prepared in this example.

As shown in FIGS. 4A and 4B, the zero shear viscosity of the system was very low when X was less than or equal to 70%, and the SEM image showed that the self-assembled structure of $G_{70}$ sample was vesicle structure. When X was greater than 70%, the zero shear viscosity of the system increased rapidly, and the system formed a worm-like micelles from vesicles at this time. By considering the requirements for good injectivity in low permeability reservoirs and for plugging $CO_2$ gas channeling, $G_{70}$ was selected to further investigate its response to $CO_2$.

Example 3

Tests on the Appearance, the Changes of Shear Viscosity and Modulus v.s. Shear Rate of the Self-Thickening Smart Fluid Before and After the Introduction of Carbon Dioxide Carbon dioxide was introduced into the $G_{70}$ sample in Example 2 and the changes in the properties of the system before and after the introduction was observed.

Figure 5:
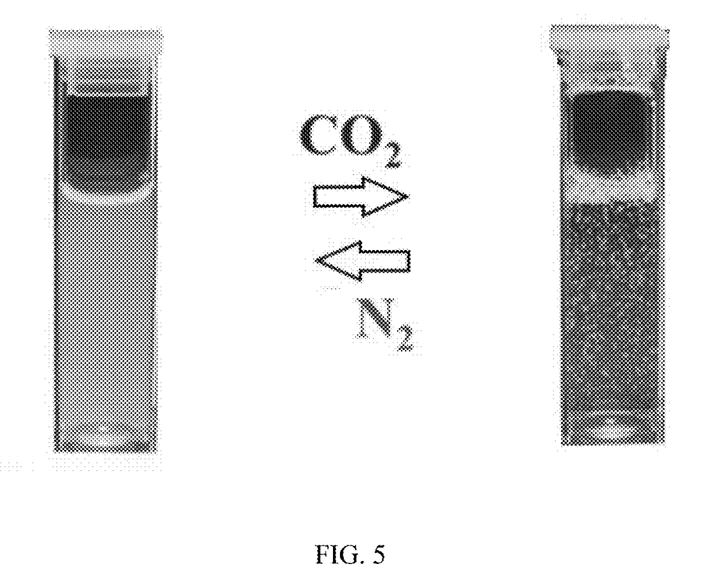
FIG. 5 is a graph showing the morphological changes of the system as obtained in Example 3 before and after the introduction of carbon dioxide.

FIG. 5 is a graph showing the morphological changes of the sample before and after the introduction of carbon dioxide. Seen from FIG. 5, before the introduction of carbon dioxide, the system was a bluish, low-viscosity liquid. Then the system became transparent and could entrap the carbon dioxide bubbles inside it after the introduction of carbon dioxide, indicating a significant increase in viscosity.

Figure 6A:
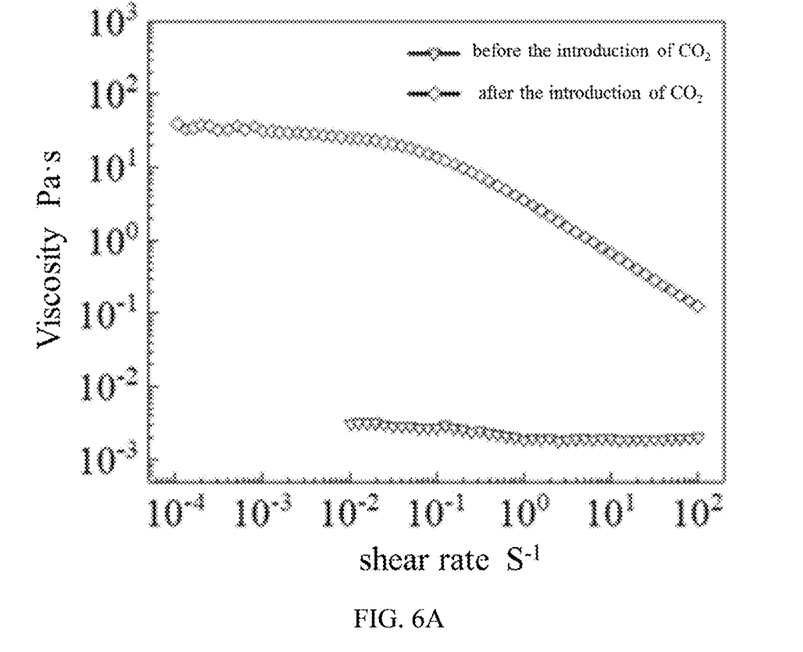
FIG. 6A is a graph showing the changes of shear viscosity v.s. shear rate of the system as obtained in Example 3 before and after the introduction of carbon dioxide.

FIG. 6A is a graph showing the changes of shear viscosity v.s. shear rate of the system before and after the introduction of carbon dioxide. The viscosity of the system was close to that of pure water before the introduction of carbon dioxide and is independent from the shear rate. However, after the introduction of carbon dioxide, the zero shear viscosity of the system was increased by 4 orders of magnitude, and in a low shear rate range of $10^{-4}$ to $10^{-1}$ $s^{-1}$, a plateau appeared in the viscosity curve, thereafter shear thinning was exhibited.

Figure 6B:
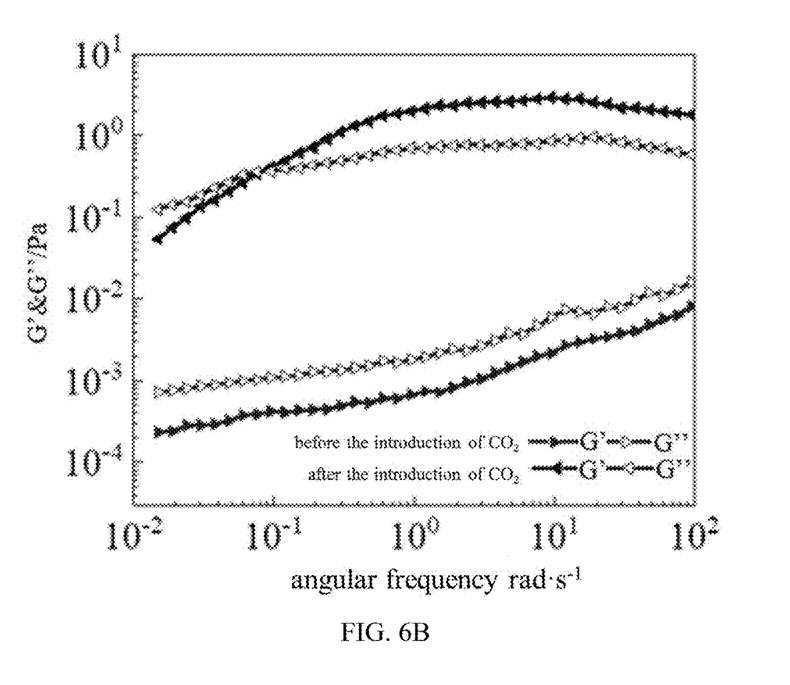
FIG. 6B is a graph showing the changes of the moduli v.s. angular frequency of the system as obtained in Example 3 before and after the introduction of carbon dioxide.

FIG. 6B is a graph showing the changes of storage modulus G' and loss modulus G" v.s. shear rate of the system before and after the introduction of carbon dioxide. From the figure, it can be seen that the storage modulus and loss modulus of the system was increased by more than two orders of magnitude before and after the introduction of carbon dioxide. In addition, the loss modulus of the system was larger than the storage modulus before the introduction of carbon dioxide, and the system behaved as a viscous fluid, while the system showed characteristics of a viscoelastic gel after the introduction of carbon dioxide.

Example 4

Test on Thickening of the Self-Thickening Smart Fluid Diluted to Different Mass Concentrations After the Introduction of Carbon Dioxide The $G_{70}$ sample in Example 2 was diluted with water to different mass concentrations, and then $CO_2$ was introduced. The viscosity of the system before and after exposure to $CO_2$ was tested with a Broofield viscometer model DV-III, at a room temperature in a shear rate of 7.34 $s^{-1}$.

Figure 6C:
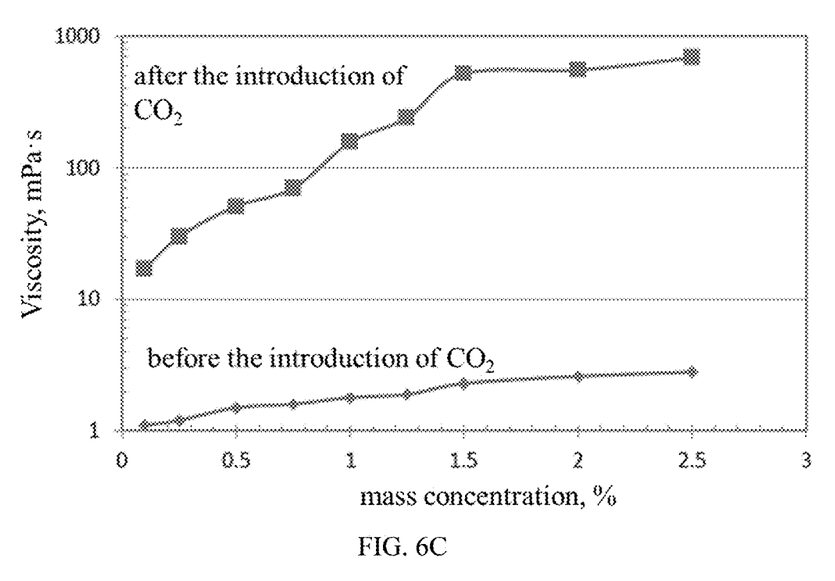
FIG. 6C is a graph showing the thickening of the system as obtained in Example 3 after the introduction of carbon dioxide when the system is diluted to different mass concentrations.

FIG. 6C is a graph showing the change of viscosity before and after the introduction of carbon dioxide for $G_{70}$ samples having different mass concentrations. As can be seen from the graph, the viscosity of the system was increased significantly from 1.1 mPa·s to 16.9 mPa·s (15.4 times for the thickening) before and after the introduction of carbon dioxide even at a low mass concentration of 0.1%. When the system has increased mass concentration, the viscosity of the thickened system also increased significantly. For a system having a mass concentration of 1.5%, the viscosity of the system increased from 2.3 mPa·s to 521.4 mPa·s (226.7 times for the thickening) before and after the introduction of carbon dioxide. In field applications, it is generally required that the viscosity may reach $10^1$ to $10^2$ mPa·s after exposure to $CO_2$ (i.e. the viscosity increased by 1-2 orders of magnitude as compared to the base fluid). As such, the self-thickening fluid of the present invention has a very wide concentration response range.

The wide concentration response range of the self-thickening fluid of the present invention makes it possible to be diluted with water and injected into subsurface reservoirs, which can significantly reduce costs and enable large-scale applications. In addition, after injecting into the underground reservoir, the dilution of groundwater will inevitably lead to a reduced concentration, and thus the wide response range can fully ensure its thickening effect.

Obviously, the above examples of the present invention are only illustrative for a clear interpretation of the present invention, and not to limit the implementation of the present invention. Other variations or changes can be made on the basis of the above description for those of ordinary skill in the field. It is not possible to exhaust all the embodiments here, but all the obvious variations or changes derived from the technical solution of the present invention are still within the protection scope of the present invention.

The invention claimed is:
1. A carbon dioxide responsive self-thickening smart fluid based on supramolecular self-assembly, comprising a

Gemini surfactant, a single-chain amide molecule with a tertiary amine head group, and water, wherein
the Gemini surfactant has a structure as follows:

and
the single-chain amide molecule with a tertiary amine head group has a structure as follows:

wherein R is selected from an alkyl chain of C11-21; n is an integer selected from 1 to 3; p is an integer selected from 1 to 6; and Y is Cl or Br, and
the Gemini surfactant and single-chain amide molecule with a tertiary amine head group self-assemble to form a vesicle structure dispersed in water, wherein the hydrophilic head group is exposed outside and the hydrophobic tail is hided inside.

2. The carbon dioxide responsive self-thickening smart fluid according to claim 1, wherein p is 3.

3. The carbon dioxide responsive self-thickening smart fluid according to claim 1, wherein Y is Br.

4. The carbon dioxide responsive self-thickening smart fluid according to claim 1, wherein R is $CH_3(CH_2)_7CH=CH(CH_2)_7—$.

5. The carbon dioxide responsive self-thickening smart fluid according to claim 1, wherein R is $CH_3(CH_2)_7CH=CH(CH_2)_7—$, n is 2, p is 3, and Y is Br.

6. The carbon dioxide responsive self-thickening smart fluid according to claim 1, wherein the Gemini surfactant is included in an amount of 1% to 4%, the single-chain amide molecule with a tertiary amine head group is included in an amount of 0.5% to 1.2%, and the balance is water; based on the total mass of the carbon dioxide responsive self-thickening smart fluid being 100%.

7. A method for preparing a carbon dioxide responsive self-thickening smart fluid according to claim 1, which is produced by a process I or II:
process I: dissolving the Gemini surfactant and single-chain amide molecule with a tertiary amine head group in a ratio in water, to obtain the carbon dioxide responsive self-thickening smart fluid; or
process II: reacting the single-chain amide molecule with a tertiary amine head group with a linking molecule of $Y—(CH_2)_p—Y$ to give a mixture of the Gemini surfactant and the unreacted single-chain amide molecule with a tertiary amine head group; controlling the molar ratio of the single-chain amide molecule with a tertiary amine head group to the linking molecule of $Y—(CH_2)_p—Y$ during the reaction, so that the ratio of the Gemini surfactant as produced by the reaction to the unreacted single-chain amide molecule with a tertiary amine head group satisfies the requirement for the ratio of them in the carbon dioxide responsive self-thickening smart fluid; and
dissolving the mixture produced by the reaction in water to obtain the carbon dioxide responsive self-thickening smart fluid.

8. The method according to claim 7, wherein in the process II, the molar ratio of the single-chain amide molecule with a tertiary amine head group to the linking molecule of $Y—(CH_2)_p—Y$ is 2.0: (0.1 to 1.0).

9. The method according to claim 7, wherein the Gemini surfactant is prepared by:
reacting the single-chain amide molecule with a tertiary amine head group with the linking molecule of $Y—(CH_2)_p—Y$ to obtain the Gemini surfactant.

10. The method according to claim 9, wherein the single-chain amide molecule with a tertiary amine head group is prepared by:
subjecting a carboxylic acid of R—COOH, where R is selected from an alkyl chain of C11-21, and a diamine of $NH_2CH_2(CH_2)_nN(CH_3)_2$ to an amidation reaction to obtain the single-chain amide molecule with a tertiary amine head group.

11. The method according to claim 10, wherein the amidation reaction comprises:
dissolving the carboxylic acid of R—COOH in organic solvent, then heating it to a temperature of 160 to 180° C.; adding a diamine of $NH_2CH_2(CH_2)_nN(CH_3)_2$ dropwise, and holding and reacting it for 6 hours to 8 hours upon the completion of addition; and cooling and removing the solvent by rotary vacuum evaporation to obtain the single-chain amide molecule with a tertiary amine head group.

12. The method according to claim 10, wherein the molar ratio of the carboxylic acid of R—COOH to the diamine of $NH_2CH_2(CH_2)_nN(CH_3)_2$ is 1: (1.2 to 1.8).

13. The method according to claim 11, wherein the molar ratio of the carboxylic acid of R—COOH to the diamine of $NH_2CH_2(CH_2)_nN(CH_3)_2$ is 1: (1.2 to 1.8).

14. The method according to claim 9, wherein the process of reacting the single-chain amide molecule with a tertiary amine head group with the linking molecule of $Y—(CH_2)_p—Y$ comprises:
dissolving the single-chain amide molecule with a tertiary amine head group in an organic solvent, adding the linking molecule of $Y—(CH_2)_p—Y$ dropwise, and heating the resultant upon the completion of addition to carry out the reaction, to obtain the Gemini surfactant.

15. The method according to claim 14, wherein the organic solvent is ethanol, the resultant is heated to a reflux temperature of ethanol, and the reaction is carried out for 6 to 16 hours.

16. Method of using of a carbon dioxide responsive self-thickening smart fluid according to claim 1 in a carbon dioxide gas flooding, wherein the method comprises:
the single-chain amide molecules with tertiary amine head groups and Gemini surfactants with quaternary ammonium head groups in the carbon dioxide responsive self-thickening smart fluid forming a vesicle structure through self-assembly;
injecting the carbon dioxide responsive self-thickening smart fluid into the formation and exposed to CO2 gas, the single-chain amide molecules with tertiary amine head groups being protonated to transform the surfactant structure from a vesicle to a worm-like micelle, to increase the system viscosity; and the increased system viscosity increasing the resistance for gas channeling along the local high permeability channel, and directing the gas to the low-permeability area.

* * * * *